United States Patent Office 2,786,504
Patented Mar. 26, 1957

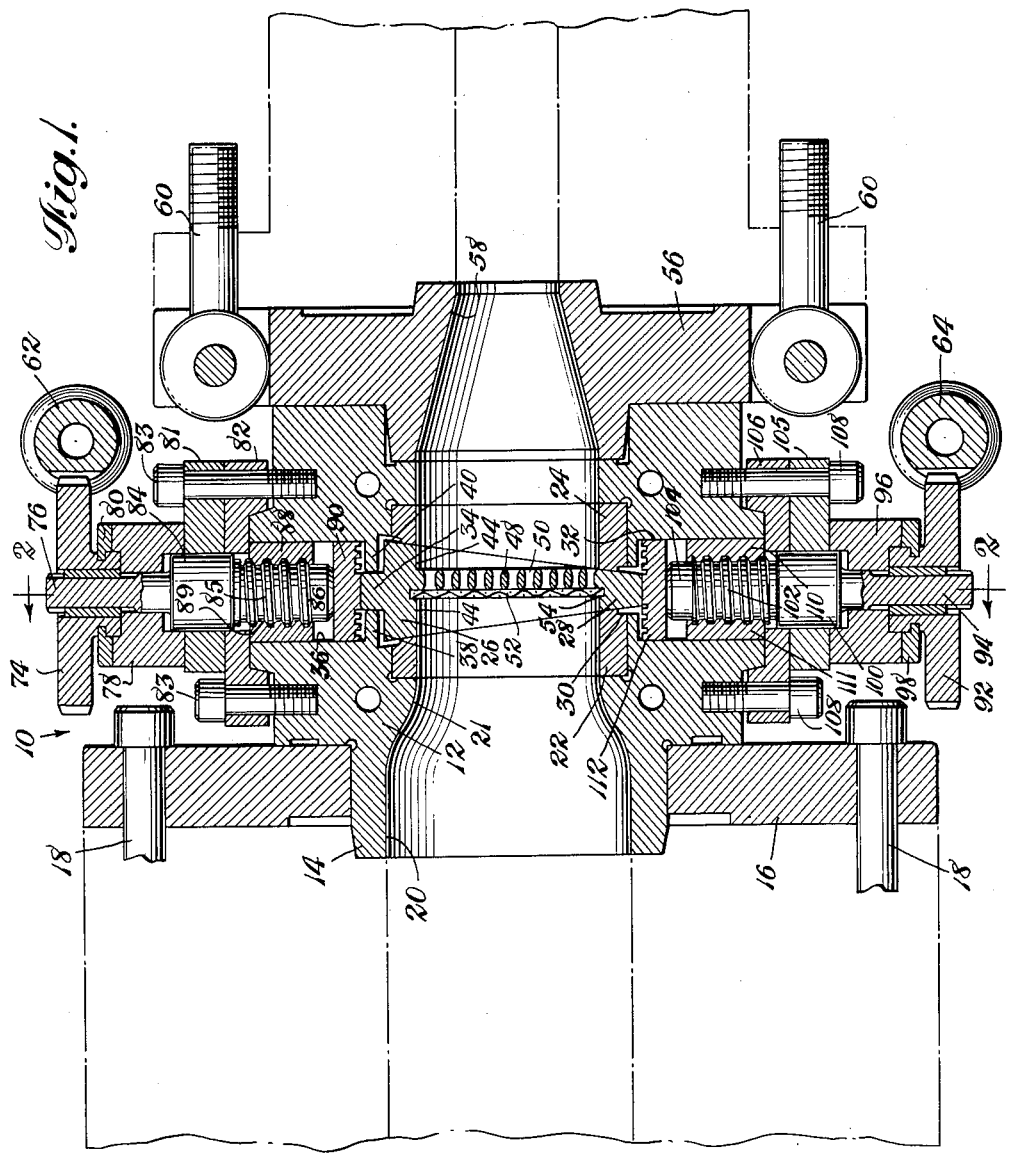

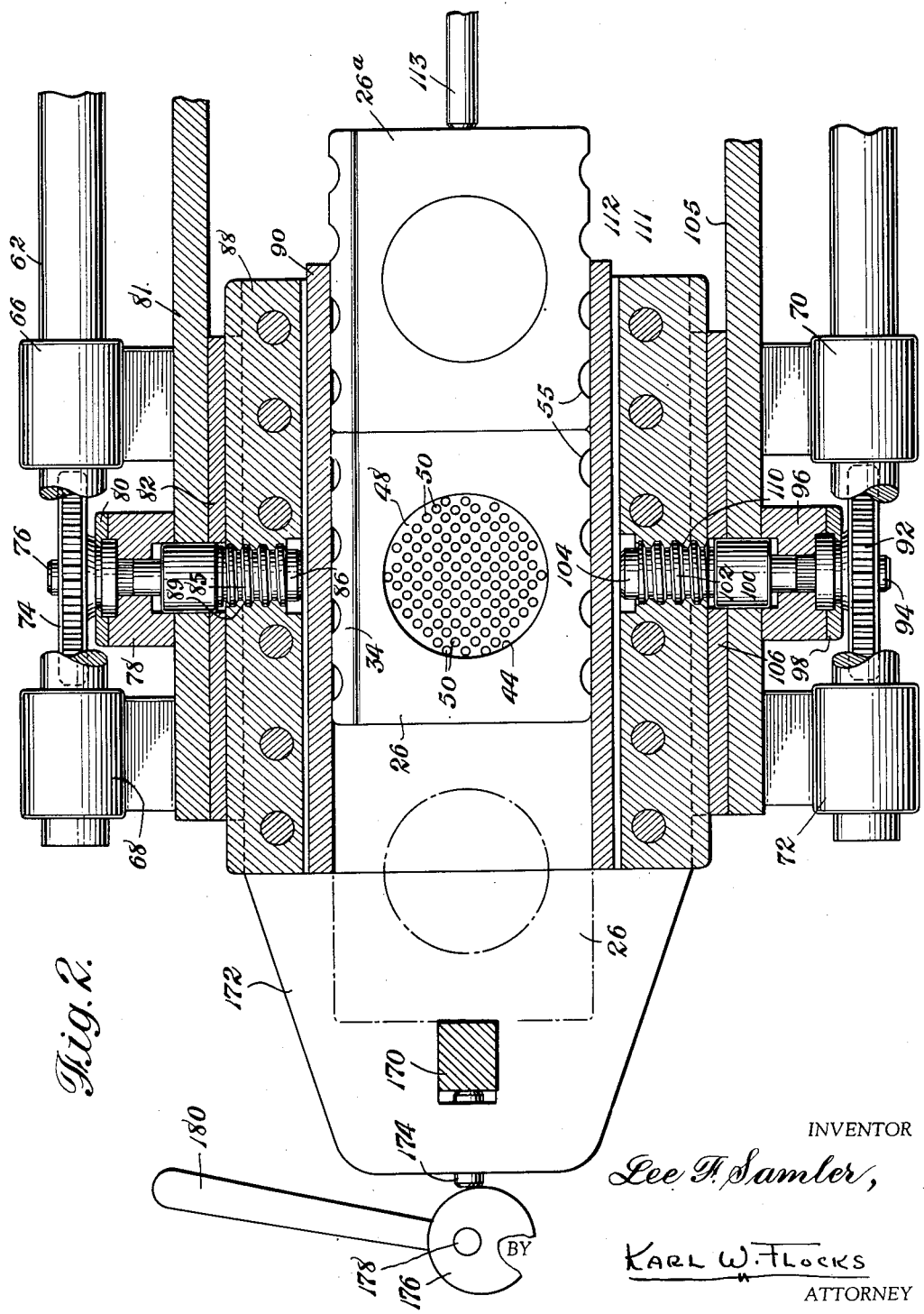

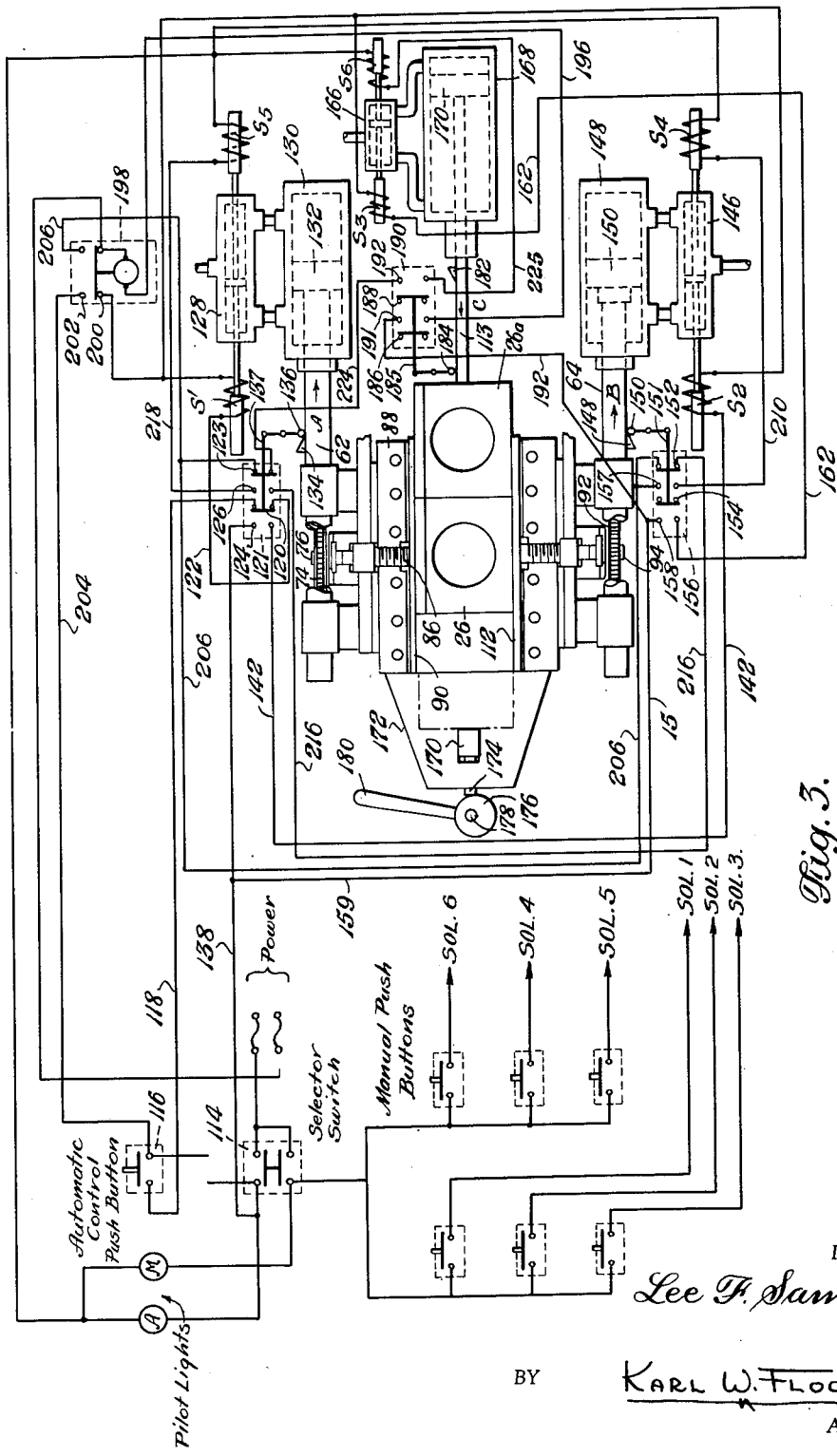

2,786,504

SCREEN CHANGING APPARATUS FOR CONDUITS AND TUBES FOR CONVEYING FLUIDS AND FOR EXTRUSION MACHINES

Lee F. Samler, Baltimore, Md., assignor to The National Plastic Products Company, Odenton, Md., a corporation of Maryland Application October 20, 1953, Serial No. 387,154

10 Claims. (Cl. 146—174)

The present invention relates to screening and extrusion apparatus. More particularly, the present invention relates to automatic control means for controlling the operation of a screen changing mechanism.

The instant application is a continuation-in-part of copending application Serial No. 293,024, filed June 11, 1952, entitled "Screen Mounting for Conduits and Tubes for Conveying Fluids and for Extrusion Machines."

In applicant's aforesaid copending application, it has been pointed out that in the construction of an extrusion machine a strainer or screen is positioned between the extruder die and screw. The primary purpose of the screen is to remove foreign particles from the extrudable material before the die is reached, thereby eliminating possible defects in the finished extruded product. During the operation of the extruder, it is necessary to change the extruder screen from time to time since the screen has a tendency to collect foreign matter rapidly. Unless the screen is changed at intervals, the continued use thereof will result in clogging and thereby cause the eventual shut-down of the extruding apparatus.

Prior to the instant invention, it was necessary, in order to change a screen for use in an extruding apparatus, to completely shut down the machine, remove the die, and then replace the screen. This operation not only resulted in a considerable loss of time and labor, but, moreover, the overall production time of the machine was materially decreased.

In order to overcome the defects in the heretofore known extrusion apparatus in changing screens, the present invention includes a system which is controlled automatically to effect the changing of the screen without shutting down the operation of the machine. By automatically controlling the screen changing operation, the extruder machine need not be shut down and the complete screen changing operation may be effected with a minimum of effort.

It is, therefore, an object of the present invention to provide screen changing apparatus for use in an extruder that may automatically effect the replacement of a screen without discontinuing the operation of the extruder.

Another object of the present invention is to provide automatic control means operatively connected to screen changing apparatus for effecting the changing of a screen in an extruder.

Other objects and the nature and advantages of the instant invention will be apparent from the following description taken in conjunction with the accompanying drawings, wherein:

Fig. 1 is a vertical sectional view illustrating the screen changing apparatus embodied in the present invention;

Fig. 2 is a view taken along the line 2—2 of Fig. 1; and

Fig. 3 is a diagrammatic illustration of the screen changing apparatus and the automatic control means for effecting the screen changing operation.

Referring to the drawings, and particularly to Fig. 1, a screen housing assembly is indicated generally at 10 and includes a body portion 12, which is formed integral with a tubular neck section 14. The neck section 14 has suitably secured thereto a head member 16 which is mounted on an extruder cylinder (not shown) by a series of stud bolts 18. The extruder cylinder, which houses the usual extruder screw member, registers with the neck section 14 and the cylinder bore is thereby adapted to communicate with a bore 20 formed in the neck section 14. The bore 20 extends inwardly from the neck section 14 into the reduced bore 21 formed in the body portion 12. Suitably secured in the body portion 12 and extending across the reduced bore 21 is a pair of ring members 22, 24 having tapered inner faces. The ring members 22, 24 are formed with their inner diameters equal to the diameter of the reduced bore 21 and are adapted to have seated between the tapered inner faces thereof a tapered screen frame 26 which, as shown in Fig. 1, comprises a platelike cast member tapering into a relatively narrow bottom portion 28. The bottom portion 28 slidably fits between the ring members 22, 24 and projects into an opening 30 formed as an extension of a recess 32 located in the body portion 12. Formed on the upper end of the screen frame 26 is a reduced portion 34 which is guided into a recess 36 formed in the body portion 12 by a pair of oppositely disposed projections 38, 40 formed as part of the body portion 12. As shown in Fig. 2, the tapered screen frame 26 has formed therein a cut-out section 44 which is circular in configuration and which has a diameter equal to the bore 21. Formed integral with the body of the screen frame 26 and disposed in the cut-out section 44 is a plate 48 having openings 50 formed therein. Also disposed in the circular cut-out section 44 and positioned adjacent the plate 48 is a screen 52 which is adapted to filter out foreign matter from the extrudable material as it is advanced through the bore 21. The screen 52 is locked in position in a suitable groove 54, which is formed in the screen frame 26. Cut out from the bottom portion 28 and upper reduced portion 34 of the screen frame 24 is a series of grooves 55 adapted to reduce the sliding area of the screen frame 24, thereby enabling the screen frame to be easily and slidably moved into position between the rings 22, 24.

Suitably secured to the body portion 12 is a die attaching head 56 which has formed therein a diverging bore 58. The bore 58 registers with the bore 21 in the body portion 12 and communicates with a suitable die (not shown) which is adapted to be secured to the die attaching head 56 by hinged bolts 60.

When the extruding machine has been in operation a sufficient length of time to collect a prohibitive amount of foreign matter in the screen 52, it is then necessary to replace the screen. It is apparent that if the screen is not replaced at this time, it will become clogged which will cause the flow of material therethrough to lessen and will eventually result in the shut-down of the machine.

In order to avoid shutting down the machine during the screen replacing operation, thereby resulting in considerable loss of time and labor, the present invention incorporates a screen replacing mechanism that efficiently and quickly accomplishes the change of screens in a matter of seconds and during the normal operation of the machine. Since the screen 52 is securely locked in the tapered screen frame 26, it is necessary to replace the entire screen frame 26 which will, in effect, change the screen. As shown in Fig. 1, the tapered screen frame 26 is firmly positioned between the ring members 22, 24 in the body portion 12. It is apparent that by moving the tapered screen frame 26 upwardly, it will become loosened and can then be slidably removed from the body portion 12. Referring now to Figs. 1 and 2, the mechanism for replacing the screen is illustrated and includes oppositely disposed racks 62, 64. The rack 62 is reciprocated by suitable power means to be described hereinafter and is supported by spaced bearing posts 66, 68. Similarly, rack 64 is reciprocated by suitable power means to be described hereinafter and is supported by spaced bearing posts 70, 72. The rack 62 engages a gear 74 which is splined to a reciprocable shaft 76 rotating in a bearing 78. The gear 74 is prevented from endwise movement by a ring 80 located adjacent the bearing 78. A frame member 81 supports the bearing 78 and has disposed thereunder in abutting relation thereto a spacer 82. The spacer 82 snugly fits on the body portion 12 and is secured thereto along with the frame member 81 by stud bolts 83. The shaft 76 has integrally connected thereto an enlarged portion 84 which extends through the frame member 81 and spacer 82 and includes a threaded portion 85 and an end portion 86. Secured in the recess 36 is a stationary elongated bar 88 which has a threaded opening 89 formed therein. The threaded portion 85 of the shaft 76 is threadedly engaged in the opening 89 while the end portion 86 of the shaft 76 abuts against an upper pressure bar 90. The upper pressure bar 90 is also disposed in the recess 36 and contacts therein the reduced portion 34 of the screen frame 26. It is apparent that the end portion 86 is raised from or lowered against the upper pressure bar 90 by actuating the suitable power means which moves the rack 62. Upon movement of the rack 62, the gear 74 rotates which causes the shaft 76 to rotate. The threaded portion 85 of the shaft 76 then rotates in the stationary elongated bar 88. The effect of this movement is to cause the shaft 76 to move vertically with respect to the bar 88, thereby varying the vertical position of the end portion 86.

The operating mechanism associated with the rack 64 is similar to that described hereinabove and includes a gear 92 engaging the rack 64. A reciprocable shaft 94 is splined to the gear 92 and rotates in a bearing 96. A retaining ring 98 secured to the gear 92 prevents endwise movement thereof. The shaft 94 includes an enlarged portion 100 which has a threaded portion 102 and an end portion 104 formed thereon. The enlarged portion 100 extends through a frame member 105 and a spacer 106, both of which are secured to the body portion 12 by stud bolts 108. The threaded portion 102 engages a threaded opening 110 formed in a stationary elongated bar 111 located in recess 32 and the end portion 104 contacts a lower pressure bar 112 also disposed in the recess 32. The pressure bar 112, in turn, abuts against the bottom portion 28 of the tapered screen frame 26 and is adapted to cause vertical movement thereof when it is desired to replace the screen frame.

Referring now to Fig. 3, the screen changing apparatus described above is diagrammatically illustrated operatively connected to the control means for effecting the screen changing operation automatically. In order to better understand the operation of the automatic control means, the complete screen changing operation will now be described with particular reference being made to Fig. 3.

The material to be extruded is forced into the bore 20 from the extruder cylinder by the extruder screw. The material passes into reduced bore 21 and then through the screen frame 26, at which point any foreign matter present in the extrudable material is strained by the screen 52 and plate 48. The strained material passes into bore 58 and then into the die which is secured adjacent thereto. After the extrusion apparatus has been in operation for a certain period of time, the screen 52 will begin to become clogged. It is then necessary to replace the screen frame 26 with a clean screen frame. Without shutting down the machine, a selector switch 114 (Fig. 3) is pushed upwardly to the automatic control position. An automatic control push button 116 is then actuated which begins the operation of the automatic control cycle for replacing the screen frame 26. When the push button 116 is pushed downwardly, the circuit is complete from the selector switch 114 through the push button 116 to line 118. Current then flows through line 118, through the normally closed contact 120 in a switch 121 and then through line 122 to a solenoid S1. The switch 121, the operation of which will be more completely described hereinafter, further includes normally closed contacts 123 and normally open contacts 124 and 126. The solenoid S1, which is operatively connected to a valve 128, is energized thereby operating the valve to allow fluid to enter a hydraulic cylinder 130. A piston 132 disposed in the hydraulic cylinder is then forced to the right, as seen in Fig. 3, thereby moving the rack 62 in the direction of the arrow A. Movement of the rack 62 in the direction of the arrow A causes the gear 74 to rotate which, in turn, causes the shaft 76 to be moved in a vertical direction a slight amount. The threaded portion 85 of the shaft 76 then rotates in the stationary elongated bar 88 and the shaft 76 is moved vertically with respect to the bar 88 to vary the vertical position of the end portion 86. This removes the downward pressure from the pressure bar 90. At the end of the stroke of rack 62, a cam 134 secured to the rack 62 engages a roller 136 which is operatively secured to a contact arm 137. Movement of the roller 136 causes the normally closed contacts 120 and 123 in the switch 121 to open and thereby remove solenoid S1 from the circuit. Current then flows from the selector switch 114 through a line 138, through the normally open contacts 124, which are now closed, and through a line 142 to a solenoid S2. Solenoid S2, which is operatively connected to a valve 146, is energized and causes fluid to flow through the valve 146 into a hydraulic cylinder 148. A piston 150 positioned in the hydraulic cylinder 148 is then forced to the right, as seen in Fig. 3, thereby moving the rack 64 in the direction of the arrow B. When the rack 64 is moved in the direction of the arrow B, the gear 92 is rotated, which causes the shaft 94 to be moved in a vertical direction and the pressure bar 112 is moved upwardly, which unlocks the screen wedge. At the end of the stroke of the rack 64, a cam 148 engages a roller 150 which is operatively secured to a contact arm 151. Movement of the roller 150 moves the contact arm 151 and causes the normally closed contacts 152 and 154 in the switch 156 to open, and normally open contacts 157 and 158 to close. Current then flows from the selector switch 114, line 138, through line 159, through the normally open contacts 158, now closed, and through line 162 to a solenoid S3. The solenoid S3, which is operatively secured to a valve 166, is then energized to move the valve 166 to allow operating fluid to enter the hydraulic cylinder 168. A piston 170 positioned in the hydraulic cylinder 168 is moved to the left, as seen in Fig. 3 and thereby forces the bar 113 secured thereto in the direction of the arrow C. Movement of the bar 113 in the direction of the arrow C moves the new screen frame 26a into position in the body portion 12 between the ring members 22 and 24 and in so doing moves the used screen frame 26 out of the body portion. Referring to Figs. 2 and 3, the correct aligned position of the new screen frame is assured by mounting a stop bar 170 in a housing 172 which is secured to the screen housing assembly 10. The stop bar 170 is controlled by a plunger 174 which is actuated by a cam 176 mounted on a shaft 178. A handle 180 is provided for manually adjusting the cam 176 which actuates the plunger 174, thereby controlling the position of the stop bar 170. It is apparent that the stop bar 170 will limit the movement of the ejected screen frame which is forced from the position between the ring members 22, 24 by the new screen.

The next phase in the operation of the automatic screen changing mechanism secures the new screen frame 26a in position in the extruder body and follows continuously from the operation described above. When the stroke of the bar 113 is completed, a cam 182 engages a roller 184 which is operatively connected to a contact arm 185. Movement of the contact arm 185 causes the normally closed contacts 186, 188 in a switch 190 to open and normally closed contacts 191 and 192 to close. Current then flows through the line 192, through the normally open contacts 191 in the switch 190, through a line 196 to a relay 198. The relay 198 is then energized which causes normally closed contacts 200 to open and normally open contacts 202 to close. When the normally closed contacts 200 of the relay 198 open, the switches 121, 156 and 190 are removed from the circuit. When the normally open contacts 202 in the relay 198 are closed, current then flows from the selector switch 114, through the push button control 116, through a line 204, contacts 202, a line 206, through the normally open contacts 157 (now closed) in the switch 154 and then through a line 210 to a solenoid S4. Since the normally open contacts 157 were closed at the time the rack 64 was moved in the direction of the arrow B, a complete circuit is made through the relay 198 and switch 156 to the solenoid S4, which is then energized. The solenoid S4, which is operatively connected to the valve 146, actuates the valve 146 to allow fluid to enter the hydraulic cylinder 148. The piston 150 is then moved in the direction opposite to the arrow B, thereby moving the rack 64 to its original position. Movement of the rack 64 in the direction opposite to the arrow B causes the pressure bar 112 to drop, which is the first step in securing the new screen frame 26a in position. At the end of the movement of rack 64 to its original position, the contact arm 151 is actuated by movement of the cam 148, and the contacts in the switch 154 are then returned to their normal position, the contacts 152 and 154 closing, and the contacts 157 and 158 opening. Since the normally open contacts 126 in the switch 121 were closed when the contact arm 137 was actuated by the rack 62, a circuit is completed through the relay 198, the line 206, contacts 152 in the switch 156, line 216, contacts 126 in the switch 121, line 218 and a solenoid S5. The solenoid S5, which is operatively connected to the valve 128, is then energized and actuates the valve 128 to allow fluid to enter in back of the piston 132 in the hydraulic cylinder 130. The piston 132 then moves the rack 62 in a direction opposite to arrow A which movement lowers the pressure bar 90 and locks the screen frame 26a in the body portion 12. At the end of the stroke of rack 62, which is moved in a direction opposite to arrow A, the normally closed contacts 120 and 123 in switch 121 are again closed. Since the normally open contacts 191 in switch 190 were closed at the time the bar 113 was moved in the direction of the arrow C, a circuit is completed through the contacts 202 in relay 198, line 206, through normally closed contacts 123 in the switch 121, through a line 224, line 225 and then through normally open contacts 192 in the switch 190, to a solenoid S6. The solenoid S6, which is operatively connected to the valve 166 is energized and thereby actuates the valve to allow fluid to flow in back of the piston 170, thereby moving the bar 113 in the direction opposite to arrow C. The bar 113 is thereby returned to its original position. When the bar 113 returns to its original position, the normally closed contacts 186, 188 in switch 190 are again closed, thereby de-energizing relay 198 which causes normally closed contacts 200 therein to close. The switches 121, 156 and 190 are then placed back in the circuit ready for another screen changing cycle.

If it is desired, the screen changing cycle may be performed manually and for this purpose the manual push buttons, indicated in Fig. 3, are provided. Each of the manual push buttons is electrically connected to a corresponding solenoid and each individual push button is thereby adapted to direct a flow of current to its respective solenoid for actuating the corresponding valve and hydraulic cylinder.

From the above description, it is apparent that a new screen frame may be put into operation automatically when it is necessary to replace a screen frame that has become clogged. The screen changing apparatus including the racks, hydraulic cylinders, and valves, are completely responsive to the automatic control means and the sequence of operation will naturally follow when the selector switch 114 and the automatic control push button 116 are actuated.

Thus it will be understood that in accordance with the invention clean screens can be shifted into leak-proof position with no crevices which make for stagnation of material.

It will be obvious to those skilled in the art that various changes may be made without departing from the spirit of the invention and therefore the invention is not limited to what is shown in the drawings and described in the specification but only as indicated in the appended claims.

What is claimed is:

1. In an apparatus, a housing having a bore formed therein, means associated with said housing for moving fluid medium through said bore, a first screening means mounted in said bore for screening said medium, a second screening means engaging said first screening means and mounted in an inoperative position in said housing, means mounted in said housing and engaging said first screening means for locking said first screening means in a sealed position in said bore, means mounted in said housing and engaging said first screening means for unsealing said first screening means from said sealed position, means engaging said second screening for moving said first screening means out of said bore and said second screening means into the operative position in said bore, a first control means operatively associated with said locking means for controlling the movement thereof, a second control means operatively associated with said unsealing means and responsive to movement of said first control means for controlling the movement of said unsealing means, a third control means operatively associated with said moving means and responsive to movement of said second control means for controlling the movement of said moving means, and means operatively associated with said first, second and third control means for causing the sequential operation thereof to automatically effect a screen replacement.

2. In an apparatus, a housing having a bore formed therein, means associated with said housing for moving fluid medium through said bore, a first screening means mounted in said bore for screening said medium, a second screening means engaging said first screening means and mounted in an inoperative position in said housing, means mounted in said housing and engaging said first screening means for locking said first screening means in a sealed position in said bore, means mounted in said housing and engaging said first screening means for unsealing said first screening means from said sealed position, means engaging said second screening means for moving said first screening means out of said bore and said second screening means into said bore, a first fluid operated means operatively associated with said locking means for controlling the movement thereof, a second fluid operated means opeartively associated with said unsealing means for controlling the movement thereof, a third fluid operated means operatively associated with said moving means for controlling the movement theerof, and means operatively connected to said first, second and third fluid operated control means for causing the sequential operation thereof, the sequential operation of said fluid operated means being effected automatically to replace said first screening means with said second screening means.

3. In an apparatus, a housing having a bore formed therein, means associated with said housing for moving fluid medium through said bore, a first screening means mounted in said bore for screening said medium, a second screening means engaging said first screening means and mounted in an inoperative position in said housing, means mounted in said housing and engaging said first screening means for locking said first screening means in a sealed position in said apparatus, means mounted in said housing and engaging said first screening means for unsealing said first screening means from said sealed position, means engaging said second screening means for simultaneously moving said first screening means out of said bore and said second screening means into said bore, a first fluid operated means operatively associated with said locking means for controlling the movement thereof, a second fluid operated means operatively associated with said unsealing means for controlling the movement of said unsealing means, a third fluid operated means operatively associated with said moving means for controlling the movement thereof, means for controlling the movement of said fluid operated means, and means responsive to movement of said fluid operated means for automatically actuating said controlling means in sequential steps, the sequential operation of said controlling means being adapted to automatically replace said first screening means with said second screening means.

4. In an apparatus, a housing having a bore formed therein, means associated with said housing for moving said fluid medium through said apparatus, a first screening means mounted in said bore for screening said medium, a second screening means engaging said first screening means and mounted in an inoperative position in said housing, means mounted in said housing and operatively engaging said first screening means for locking said first screening means in a sealed position in said apparatus, means mounted in said housing and operatively engaging said first screening means for unsealing said first screening means from said sealed position, means engaging said second screening means for simultaneously moving said first screening means out of said apparatus and said second screening means into said apparatus, a first fluid operated means operatively connected to said locking means for controlling the movement thereof, a second fluid operated means operatively connected to said unsealing means for controlling the movement thereof, a third fluid operated means operatively connected to said moving means for controlling the movement thereof, means operatively connected to said first fluid operated means for causing movement thereof to unlock said first screening means, means operatively connected to said first fluid operated means and responsive to the movement thereof for moving said second fluid operated means to unseal said first screening means, means operatively connected to said second fluid operated means and responsive to the movement thereof for moving said third fluid operated means to simultaneously move said first screening means out of said apparatus and said second screening means into said apparatus, means associated with said second fluid operated means and responsive to the movement of said third fluid operated means for moving said second fluid operated means back to the original position thereof thereby moving said unsealing means to the original position, means associated with said first fluid operated means and responsive to the movement of said second fluid operated means for moving said first fluid operated means to the original position thereof, thereby causing said locking means to lock said second screening means in said apparatus, and means responsive to the movement of said first fluid operated means for moving said third fluid operated means to the original position thereof thereby completing the screen changing cycle.

5. In an apparatus, a housing having a bore formed therein, means mounted in said housing for moving fluid medium through said bore, a first screening means positioned in said bore for screening said medium, a second screening means mounted in said housing in contact with said first screening means and in an inoperative position, means mounted in said housing and engaging said first screening means for locking said first screening means in a sealed position in said apparatus, means mounted in said housing and engaging said first screening means for unsealing said first screening means from said sealed position when said first screening means is to be replaced, means engaging said second screening means for simultaneously moving said first screening means out of said apparatus and said second screening means into said apparatus, a first control means operatively associated with said locking means for controlling the movement thereof, a second control means operatively associated with said unsealing means and responsive to the movement of said first control means for controlling the movement of said unsealing means, a third control means operatively associated with said moving means and responsive to the movement of said second control means for controlling the movement of said moving means, cam means associated with each said locking, unsealing and moving means and actuated by said control means for sequentially controlling the operation of said locking means, unsealing means and moving means to automatically replace said first screening means with said second screening means thereby continuously and effectively screening said fluid medium passing through said apparatus.

6. In an apparatus, a housing having a bore formed therein, means associated with said housing for moving fluid medium through said bore, means positioned in said bore for screening said medium, means associated with said housing for locking said screening means in a sealed position in said bore, means positioned in said housing for unsealing said screening means from said sealed position, means engaging said screening means for moving said screening means out of said apparatus when said screening means becomes inoperative for further usage, and control means for automatically and sequentially actuating said locking means, unsealing means and moving means, the control means for said unsealing means being responsive to movement of said locking means, and the control means for said moving means being responsive to movement of said unsealing means to change said screening means.

7. In an apparatus, a housing having a bore formed therein, means associated with said housing for moving fluid medium through said bore, means positioned in said bore for screening said medium, means associated with said housing for locking said screening means in a sealed position in said bore, means associated with said housing for unsealing said screening means from said sealed position, means operatively engaging said screening means for moving said screening means out of said bore when said screening means becomes inoperative for further usage, fluid operated means operatively connected to said locking, unsealing and moving means for causing the operation thereof, cam means associated with each of said locking, unsealing and moving means, control means engaging said cam means and responsive to movement of said fluid operated means for automatically and sequentially operating said locking, unsealing and moving means to effect a replacement of said screening means.

8. In an apparatus, a housing having a bore formed therein, means associated with said housing for moving fluid medium through said apparatus, a first screening means positioned in said bore for screening said medium, a second screening means engaging said first screening means and located in an inoperative position in said housing, means associated with said housing for locking said first screening means in a sealed position in said bore, means associated with said housing for unsealing said first screening means from said sealed position, means engaging said second screening means for simultaneously moving said first screening means out of said bore and said second screening means into said bore when said first screening means becomes inoperative for further usage, a first fluid operated means operatively connected to said locking means for controlling movement thereof, a first valve means operatively connected to said first fluid operated means for controlling the flow of fluid therein, a second fluid operated means operatively connected to said unsealing means for controlling movement thereof, a second valve means operatively connected to said second fluid operated means for controlling the flow of fluid therein, a third fluid operated means operatively connected to said moving means for controlling movement thereof, a third valve means operatively connected to said third fluid operated means for controlling the flow of fluid therein, and electrically operated control means responsive to the movements of said fluid operated means for controlling the movement of said valve means to automatically and sequentially actuate said locking, unsealing and moving means thereby replacing said first screening means with said second screening means to effectively and continuously screen said fluid medium passing through said apparatus.

9. In an apparatus, a housing having a bore formed therein, means associated with said housing for moving fluid medium through said bore, means positioned in said bore for screening said medium, means associated with said housing for locking said screening means in a sealed position in said apparatus, means associated with said housing for unsealing said screening means from said sealed position, means operatively engaging said screening means for moving said screening means out of said bore when said screening means becomes inoperative for further usage, a first control means operatively connected to said locking means for controlling the movement thereof, a second control means operatively connected to said unsealing means and responsive to said first control means for controlling the movement of said unlocking means, and a third control means operatively connected to said moving means and responsive to said second control means for controlling the movement of said moving means to effect the replacement of said screening means.

10. In an appartus as set forth in claim 9, wherein said control means include fluid operated means and cam means operatively secured to said fluid operated means, said cam means being responsive to the movement of said fluid operated means to control the operation of said locking means, unsealing means, and moving means.

References Cited in the file of this patent

UNITED STATES PATENTS

| 642,813 | Cowen | Feb. 6, 1900 |
| 642,814 | Cowen | Feb. 6, 1900 |
| 1,195,576 | Garrahan | Aug. 22, 1916 |
| 2,507,311 | Lodge | May 9, 1950 |
| 2,661,497 | Birmingham | Dec. 8, 1953 |

FOREIGN PATENTS

| 637,137 | Great Britain | May 10, 1950 |